3,288,227
HELICOPTER ROTOR SYSTEM
Hans Derschmidt, Munich, Germany, assignor to Bolkow Gesellschaft mit beschrankter Haftung, Ottobrunn, Germany
Filed May 18, 1965, Ser. No. 456,640
Claims priority, application Germany, May 22, 1964, B 76,880
11 Claims. (Cl. 170—160.26)

This invention relates to the longitudinal stabilization of the rotary wing aircraft and, more particularly, to a novel and improved mechanism for transmitting inclinations of the rotor to the swash plate for control of the pitch angle of the rotor blades in an inclination correcting direction.

During forward flight, the rotor of a rotary wing aircraft is subjected to certain changes in its longitudinal inclination relative to the fuselage or body of the aircraft. In turn, these changes result in an increase in the load factor of the aircraft and a disturbance of the equilibrium of the moments thereof. Such changes in the longitudinal inclination of the rotor, relative to the fuselage or body of the aircraft, are caused by squalls, small disturbances, or different flying maneuvers, and are particularly apparent in one-rotor aircraft. These changes in the longitudinal inclination of the rotor relative to the fuselage of the aircraft are generally undesired, so that the pilot has to take measure to correct the situation. This, of course, makes the flying of such aircraft more difficult. Consequently, and in order to eliminate this disadvantage of rotary wing aircraft, different arrangements have been proposed for automatically restoring of the rotor to an initial inclination responsive to the rotor assuming undesired inclinations.

One of these known arrangements "takes off," "taps," or "senses" the respective rotor inclinations by means of a rigid rod mechanism connected to the rotor head, and transmits the inclinations to a swash plate. The movements of this swash plate are damped by an additional rod mechanism, and are transmitted in a resilient manner to another swash plate controlling the pitch angle of the blades. This change in the pitch angle of the blades is intended to correct the longitudinal inclination of the rotor.

An arrangement of this type is very complicated and expensive to construct, and has the disadvantage that movements of the swash plates are damped only relative to each other, but are not damped relative the fuselage of the aircraft. Thus, in the case of a considerable adjustment, if the permissible inclination of the rotor is to be kept particularly small by a high restoration ratio, the rotor is caused to perform an unstable flapping or hunting movement at a high frequency.

In another arrangement for the stabilization of rotary wing aircraft, the longitudinal inclination of the rotor is taken off, tapped, or sensed from a special bearing surrounding the rotor head. The rotor inclination is transmitted through a rigid rod mechanism and a shift lever to the swash plate without damping. The swash plate then effects a corresponding change of the pitch angle of the rotor blades. Due to the complete undamped transmission of the movement of the rotor, this latter stabilization arrangement is also highly unsatisfactory because, with a large inclination of the rotor, unstable flapping or hunting movements of the rotor, at high frequencies, are caused.

An object of the present invention is to provide a longitudinal stabilization arrangement for rotary wing aircraft and which is free of the disadvantages of prior art arrangements.

Another object of the present invention is to provide a longitudinal stabilization arrangement for a rotary wing aircraft and with which high restoration ratios may be used without causing unstable high frequency flapping or hunting movements of the rotor.

A further object of the invention is to provide a longitudinal stabilization arrangement for rotary wing aircraft and which is simple in design and inexpensive in construction.

Yet another object of the invention is to provide a longitudinal stabilization arrangement for rotary wing aircraft wherein the rotor inclination is transmitted through rod mechanism and a shift lever to the swash plate, and wherein an elastic member or means is interposed in the rod mechanism.

Still another object of the invention is to provide a longitudinal stabilization arrangement for rotary wing aircraft, wherein the rotor inclination is transmitted through rod mechanism to the swash plate controlling the pitch of the rotor blades, and wherein an elastic member is interpositioned in the rod mechanism and is followed, in the rod mechanism, by damping means interposed between the rod mechanism and the fuselage of the aircraft.

The longitudinal stabilization arrangement for rotary wing aircraft in accordance with the invention has the advantage that, due to the provision of the damping means, transmission to the swash plate of rapid changes of the rotor position, such as occur with high frequency flapping or hunting movements, is opposed by a large resistance. Thereby, such rapid movements are compensated by a corresponding deformation of an elastic member interposed in the transmission system. Due to the fact that high frequency movements of the rotor are not transmitted to the swash plate, unstable flapping or hunting movements of the rotor are prevented. On the other hand, the damping means does not oppose relatively slow changes in the rotor inclination, as the elastic member is not deformed during such slow changes so that movement of the rotor is transmitted in full to the swash plate.

A further object of the invention is to provide a longitudinal stabilization arrangement for rotary wing aircraft including a rod system for transmitting the rotor inclination to a swash plate and having interposed therein an elastic means in the form of helical or coil springs. This feature has the advantageous effect that the rod system remains substantially rigid until a preset force is applied thereto. Thus, the rod system conducts or transmits forces which occur upon a slow change of the rotor inclination in the same manner as do rigid structures. By contrast, upon transmission of a rapid change of the rotor inclination, the opposing damping forces exceed the bias of the helical or coil springs, so that these movements are compensated in the system by a deformation of the helical or coil springs.

Still another object of the present invention is to provide an arrangement for longitudinal stabilization of a rotary wing aircraft, of the type just mentioned, and in which the helical or coil springs are arranged between pressure plates and opposing abutments in such a manner that the springs are subjected only to pressure stresses. By this feature of the invention, the advantage is obtained that the elastic intermediate members, which are interposed in the rod systems, have the same bias in each direction of movement of the systems.

Yet a further object of the invention is to provide a longitudinal stabilization system of rotary wing aircraft, of the type just mentioned, and in which the damping means, interposed between the rod system and the fuselage of the aircraft, are constructed as double acting liquid damping means. This has the advantage that, in each instance, the damping means exert speed-dependent damping forces so that a reliable filtering out of high frequency movements of the rotor, before these are transmitted to the swash plate, is secured.

For an understanding of the principles of the invention, reference is made to the following description of a typical embodiment thereof as illustrated in the accompanying drawings.

Figure 1:
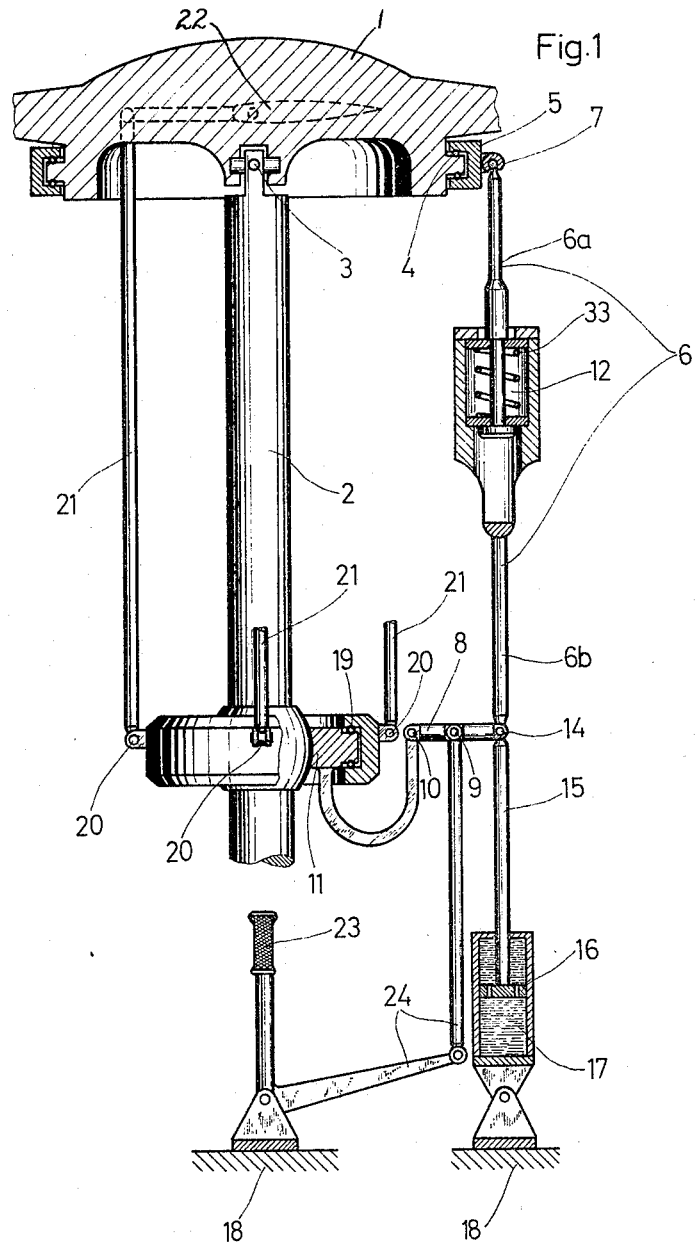
FIG. 1 is a simple side elevation view, partly in section, of one form of longitudinal stabilization arrangement embodying the invention.

Referring to FIG. 1, the rotor head 1 of a rotary wing aircraft is illustrated as connected, through a Cardan or universal joint 3, with the rotor shaft 2. Rotor head 1 comprises a rotatable part 4 engaged in a stationary part 5 embracing the part 4, and with the interposition of anti-friction bearings. Stationary part 5 of rotor head 1 serves to "take off," "tap," or "sense" the rotor inclination through a rod mechanism 6 connected to part 5 through a universal ball joint 7.

Rod mechanism 6 transmits the rotor inclination from stationary part 5 of rotor head 1 to the shifting or reversing lever 8. This lever is pivotally mounted, intermediate its ends, on a bearing 9, and has one end connected, through a universal joint 10, to a stationary part 11 of the swash plate. Thereby, the direction of movement of swash plate part 11 is reversed relative to the direction of movement of fixed rotor part 5, due to the intermediately pivoted lever 8.

An elastic member 12 is interpositioned in rod mechanism 6, dividing the rod mechanism into two halves 6a and 6b. A detailed description of the elastic member or means 12 will be provided with reference to FIGS. 2, 3 and 4. The lower half 6b of the rod mechanism has connected thereto, at its connection to lever 8, the piston rod 15 of a damping piston 16. Damping piston 16 acts within a double acting liquid damping means 17 connected to the aircraft fuselage 18. Rod 15 is rectilinearly aligned with rod parts 6a and 6b.

Upon the occurrence of a sudden, or impact-like, change of inclination of rotor head 1 relative to fuselage 18, rod mechanism 6 has an impulse imparted thereto, through stationary part 5 of rotor head 1 and ball bearing 7. However, damping means 17 opposes a rapid movement of the lower half 6b of the rod system, as the resistance of the damping means is larger than the bias of the coil spring 33 of elastic means 12. Thereby, movement of the upper half 6a of the rod mechanism relative to the lower half 6b is absorbed by the elastic means 12. Thus, no change in the position of swash plate part 11 is effected.

However, if the inclination of rotor 1 is changed in a relatively slow manner, then the resistance of damping means 17 can be overcome without deformation of elastic means 12. In this instance, the inclination of rotor head 1 is transmitted directly to swash plate part 11 through rod mechanism halves 6a and 6b and through shift lever 8. Rods 21 are pivotally connected, at joints 20, to the rotating part 19 of the swash plate. Consequently, upon movement of the stationary part 11 of the swash plate, the rotating part also moves to change the pitch angle of rotor blades 22 in a corrective direction, these rotor blades 22 being connected to the upper ends of rods 21.

In further accordance with the invention, a lever connection 24 is provided between the aircraft control stick 23 and shift lever 8. This lever connection 24 makes it possible for the pilot to manually control the rotor in addition ot the automatic control just described.

Figure 3:
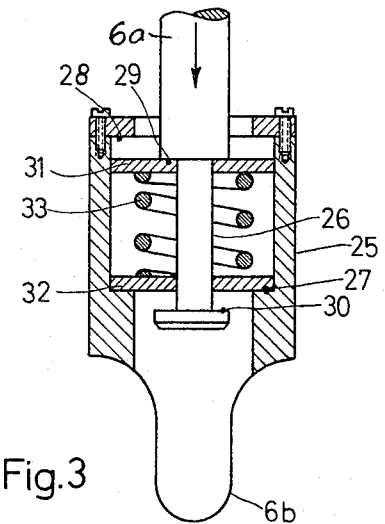
FIG. 3 is a view, similar to FIG. 2, illustrating the elastic means, under the action of a pressure force.
Figure 2:
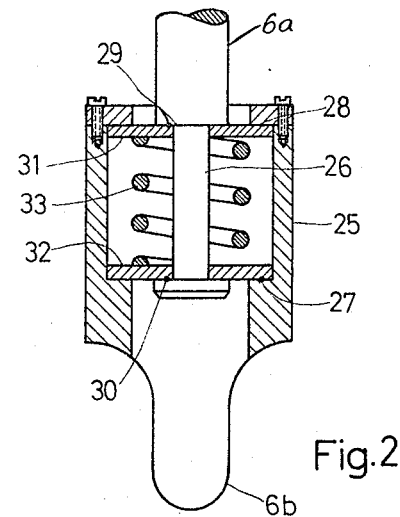
FIG. 2 is a sectional view of a preferred form of elastic member or means interposed in the rod system of FIG. 1.
Figure 4:
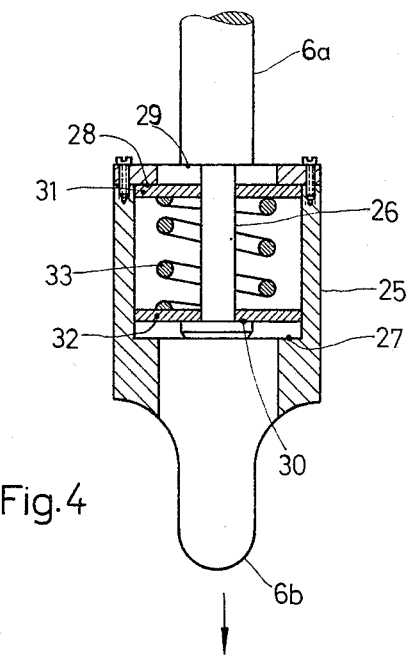
FIG. 4 is a view, similar to FIG. 2, illustrating the action of the elastic means under the action of a tension force.

FIGS. 2, 3 and 4 illustrate the elastic member of FIG. 1 to a larger scale and under different load conditions. The enlarged cylindrical upper portion 25 of lower rod mechanism half 6b, and the lower portion 26 of upper rod mechanism half 6a, are arranged in interengaging manner. Cylindrical portion 25 has a lower abutment or shoulder 27, and an upper abutment or shoulder 28. Portion 26 of rod mechanism half 6a has an upper abutment or shoulder 29, and a lower abutment or shoulder 30. The distance between abutments 27 and 28, and the distance between abutments 29 and 30, is fixed and constant. Within the space between abutments 27 and 28, there is positioned a pre-tensioned compression coil or helical spring 33, this spring being engaged between an upper pressure plate 31 and a lower pressure plate 32, both embracing the reduced extension 26 of the upper rod mechanism half 6a.

If a pressure force is exerted on the elastic means, then the parts assume the position of FIG. 3. In FIG. 3, upper pressure plate 31 is moved downwardly by engagement with abutment 29, and a compressing pressure is exerted on spring 33. In turn, spring 33, through the pressure plate 32 engaging abutment 37 of portion 25, exerts a downward pressure on portion 25 and thus on lower half 6b of the rod mechanism 6.

However, if a tension force is exerted on lower half 6b of the rod mechanism, the parts assume the position of FIG. 4. The part 25 moves downwardly so that its shoulder 28 moves the upper pressure plate 31 downwardly again compressing the spring 33 and, through lower pressure plate 32 in engagement with shoulder or abutment 30, a downward force is exerted on the upper half 6a of the rod mechanism.

While a specific embodiment of the invention has been shown and described in detail to illustrate the application of the principles of the invention, it will be understood that the invention may be embodied otherwise without departing from such principles.

What is claimed is:

1. Device for the longitudinal stabilization of rotary wing aircraft having an inclinable rotor head, rotor blades angularly adjustable on the rotor head and a displaceable swash plate controlling the pitch angle of the rotor blades, said device comprising, in combination, substantially rectilinear rod means connected at one end to said rotor head; lever means connected between said swash plate and the other end of said rod means; resilient means interpositioned in said rod means and providing of relative rectilinear displacement of the ends of the latter towards and away from each other; and damping means connected to said rod means between said resilient means and said other end of said rod means and connected to the aircraft fuselage.

2. Device for the longitudinal stabilization of rotary wing aircraft having an inclinable rotor head, rotor blades angularly adjustable on the rotor head and a displaceable swash plate controlling the pitch angle of the rotor blades, said device comprising, in combination, substantially rectilinear rod means connected at one end to said rotor head; lever means connected between said swash plate and the other end of said rod means; resilient means interpositioned in said rod means and providing for relative rectilinear displacement of the ends of the latter towards and away from each other; and damping means connected to said other end of said rod means and connected to the aircraft fuselage; said damping means having a resistance to relative rapid displacement of said rod means greater than the bias of said resilient means.

3. Device for the longitudinal stabilization of rotary wing aircraft having an inclinable rotor head, rotor blades angularly adjustable on the rotor head and a displaceable swash plate controlling the pitch angle of the rotor blades, said device comprising, in combination, two-part substantially rectilinear rod means including a first part connected to said rotor head; lever means connected between said swash plate and the second part of said rod means; resilient means interpositioned between the two parts of said rod means and biasing the same apart, and providing for relative rectilinear displacement of the two parts of the rod means toward each other against the bias of said resilient means; and damping means connected to the aircraft fuselage and to said second part of said rod means.

4. Device for the longitudinal stabilization of rotary wing aircraft having an inclinable rotor head, rotor blades angularly adjustable on the rotor head and a displaceable swash plate controlling the pitch angle of the rotor blades, said device comprising, in combination, two-part substantially rectilinear rod means including a first part connected to said rotor head; lever means connected between said swash plate and the second part of said rod means; resilient means interpositioned between the two parts of said rod means and biasing the same apart, and providing for relative rectilinear displacement of the two parts of the rod means toward each other against the bias of said resilient means; and damping means connected to the aircraft fuselage and to said second part of said rod means; said damping means having a resistance to relative rapid displacement of said rod means greater than the bias of said resilient means.

5. Device for the longitudinal stabilization of rotary wing aircraft having an inclinable rotor head, rotor blades angularly adjustable on the rotor head and a displaceable swash plate controlling the pitch angle of the rotor blades, said device comprising, in combination, two-part substantially rectilinear rod means including a first part connected to said rotor head; lever means connected between said swash plate and the second part of said rod means; resilient means interpositioned between the two parts of said rod means and biasing the same apart, and providing for relative rectilinear displacement of the two parts of the rod means toward each other against the bias of said resilient means; and damping means connected to the aircraft fuselage and to said second part of said rod means; said resilient means comprising a compression coil spring subjected solely to compression stresses upon relative movement of the parts of said rod means.

6. Device for the longitudinal stabilization of rotary wing aircraft having an inclinable rotor head, rotor blades angularly adjustable on the rotor head and a displaceable swash plate controlling the pitch angle of the rotor blades, said device comprising, in combination, substantially rectilinear rod means connected at one end to said rotor head; lever means connected between said swash plate and the other end of said rod means; resilient means interpositioned in said rod means and providing for relative rectilinear displacement of the ends of the latter towards and away from each other; and damping means connected to said other end of said rod means and connected to the aircraft fuselage; said lever means including a force directing reversing lever.

7. Device for the longitudinal stabilization of rotary wing aircraft having an inclinable rotor head, rotor blades angularly adjustable on the rotor head and a displaceable swash plate controlling the pitch angle of the rotor blades, said device comprising, in combination, two-part substantially rectilinear rod means including a first part connected to said rotor head; lever means connected between said swash plate and the second part of said rod means; resilient means interpositioned between the two parts of said rod means and biasing the same apart, and providing for relative rectilinear displacement of the two parts of the rod means toward each other against the bias of said resilient means; and damping means connected to the aircraft fuselage and to said second part of said rod means; said resilient means comprising a double acting coil compression spring subjected solely to compression forces upon relative movement of the two parts of said rod means.

8. Device for the longitudinal stabilization of rotary wing aircraft having an inclinable rotor head, rotor blades angularly adjustable on the rotor head and a displaceable swash plate controlling the pitch angle of the rotor blades, said device comprising, in combination, substantially rectilinear rod means connected at one end to said rotor head; lever means connected between said swash plate and the other end of said rod means; resilient means interpositioned in said rod means and providing for relative rectilinear displacement of the ends of the latter towards and away from each other; and double acting damping means connected to said other end of said rod means and connected to the aircraft fuselage.

9. Device for the longitudinal stabilization of rotary wing aircraft having an inclinable rotor head, rotor blades angularly adjustable on the rotor head and a displaceable swash plate controlling the pitch angle of the rotor blades, said device comprising, in combination, two part substantially rectilinear rod means including a first part connected to said rotor head; lever means connected between said swash plate and the second part of said rod means; resilient means interpositioned between the two parts of said rod means and biasing the same apart, and providing for relative rectilinear displacement of the two parts of the rod means toward each other against the bias of said resilient means, and double acting damping means connected to the aircraft fuselage and to said second part of said rod means; said resilient means comprising a double acting coil compression spring subjected solely to compression forces upon relative movement of the two parts of said rod means.

10. Device for the longitudinal stabilization of rotary wing aircraft having an inclinable rotor head, rotor blades angularly adjustable on the rotor head and a displacement angularly adjustable on the rotor head and a displaceable said device comprising, in combination, two-part substantially rectilinear rod means including a first part connected to said rotor head; lever means connected between said swash plate and the second part of said rod means; resilient means interpositioned between the two parts of said rod means and biasing the same apart, and providing for relative rectilinear displacement of the two parts of the rod means toward each other against the bias of said resilient means; and damping means connected to the aircraft fuselage and to said second part of said rod means; said first rod means part being formed with a reduced cross section inner end having a pair of facing shoulders spaced at a fixed distance longitudinally from each other; said second rod means part having a cylindrical inner end embracing the inner end of said first rod means part and formed with a pair of facing annular shoulders spaced at a fixed distance longitudinally from each other; said resilient means including a pair of pressure plates embracing the reduced cross section end of said first rod means part, and a compression coil spring embracing said reduced cross section inner end of said first means part and biasing said pressure plates apart and into engagement with said shoulders.

11. Device for the longitudinal stabilization of rotary wing aircraft having an inclinable rotor head, rotor blades angularly adjustable on the rotor head and a displacement swash plate controlling the pitch angle of the rotor blades, said device comprising, in combination, substantially rectilinear rod means connected at one end to said rotor head; lever means connected between said swash plate and the other end of said rod means; resilient means interpositioned in said rod means and providing for relative rectilinear displacement of the ends of the latter towards and away from each other; damping means connected to said other end of said rod means and connected to the aircraft fuselage; said lever means including a force direction reversing lever; the aircraft including a manual control stick; and means connecting said manual control stick to said force direction reversing lever.

No references cited.

MARTIN P. SCHWADRON, *Primary Examiner.*

E. A. POWELL, JR., *Assistant Examiner.*